United States Patent
Wong (10) Patent No.: US 10,637,682 B2
(45) Date of Patent: Apr. 28, 2020

(54) SMART HOME LEARNING SYSTEM INCLUDING USER BEHAVIOR

(71) Applicant: Oracle International Corporation, Redwood Shores, CA (US)

(72) Inventor: Hinkmond B. Wong, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 502 days.

(21) Appl. No.: 14/178,113

(22) Filed: Feb. 11, 2014

(65) Prior Publication Data
US 2015/0227118 A1    Aug. 13, 2015

(51) Int. Cl.
*H04L 12/28* (2006.01)
*G05B 15/02* (2006.01)
*G06N 5/02* (2006.01)

(52) U.S. Cl.
CPC ......... *H04L 12/2827* (2013.01); *G05B 15/02* (2013.01); *G05B 2219/2642* (2013.01); *G06N 5/025* (2013.01); *H04L 12/2821* (2013.01)

(58) Field of Classification Search
CPC ...... G06N 99/005; G06N 7/005; G06N 5/025; G05B 15/00–02; G05B 13/00–048; G05B 2219/163; G05B 2219/25011; G05B 2219/25168; G05B 2219/2642; H04L 12/2803–2838

(Continued)

(56) References Cited

U.S. PATENT DOCUMENTS

| | | | | |
|---|---|---|---|---|
| 8,350,697 B2 * | 1/2013 | Trundle | ............... | F24F 11/0086 340/539.26 |
| 8,630,741 B1 * | 1/2014 | Matsuoka | ........... | H04L 12/2829 700/12 |

(Continued)

OTHER PUBLICATIONS

Das, K., et al., "The Role of Predcition Algorithms in the MavHome Smart Home Architecture", IEEE Wireless Communications [ online], vol. 9, No. 6, Dec. 2002 [retrieved Nov. 5, 2018], Retrieved from Internet: <URL: https://ieeexplore.ieee.org/document/1160085>, pp. 77-84.*

(Continued)

*Primary Examiner* — Todd Aguilera
(74) *Attorney, Agent, or Firm* — Tarolli, Sundheim, Covell & Tummino LLP (57) ABSTRACT

A system and method for facilitating automatic control of devices, such as network-coupled home appliances. An example method includes receiving and storing data available from plural devices, resulting in stored data; determining a pattern in the stored data; using the pattern to generate one or more control signals; and forwarding the one or more control signals to one or more of the plural devices to selectively control one or more device features or behaviors consistent with the pattern. In a more specific embodiment, the method further includes collecting a first set of data from one or more devices; obtaining a second set of data from a server coupled to a network; analyzing the first set of data and the second set of data to determine one or more predictive control signals; and employing the one or more control signals to adjust one or more behaviors of the one or more devices.

17 Claims, 5 Drawing Sheets

(58) Field of Classification Search
USPC .................................... 700/28, 44, 47–52
See application file for complete search history.

(56) References Cited

U.S. PATENT DOCUMENTS

| | | | | |
|---|---|---|---|---|
| 8,849,771 | B2* | 9/2014 | Berg-Sonne | G05B 15/02 707/687 |
| 9,176,485 | B2* | 11/2015 | Krumm | G05B 15/02 |
| 9,208,676 | B2* | 12/2015 | Fadell | G05B 19/042 |
| 9,489,645 | B2* | 11/2016 | Brown | G06Q 10/06 |
| 2005/0267788 | A1* | 12/2005 | Brown | G06Q 10/06 700/100 |
| 2006/0123150 | A1* | 6/2006 | Iwai | G06Q 10/10 710/15 |
| 2010/0289643 | A1* | 11/2010 | Trundle | F24F 11/0086 340/545.1 |
| 2011/0181412 | A1* | 7/2011 | Alexander | G05B 19/042 340/541 |
| 2012/0143810 | A1* | 6/2012 | Berg-Sonne | G05B 15/02 706/47 |
| 2012/0150463 | A1* | 6/2012 | Ozawa | G05B 15/02 702/62 |
| 2012/0200657 | A1* | 8/2012 | Iwai | G06Q 10/10 348/14.02 |
| 2012/0310376 | A1* | 12/2012 | Krumm | G05B 15/02 700/31 |
| 2012/0323385 | A1* | 12/2012 | Thiruvengada | G06F 1/3203 700/291 |
| 2014/0266669 | A1* | 9/2014 | Fadell | G05B 19/042 340/501 |
| 2014/0324244 | A1* | 10/2014 | Musunuri | G05B 15/02 700/299 |
| 2014/0343698 | A1* | 11/2014 | Kakuta | H02J 3/14 700/90 |
| 2015/0088329 | A1* | 3/2015 | Thiruvengada | G06F 1/3203 700/291 |

OTHER PUBLICATIONS

How the Nest Learning Thermostat Works; obtained at http://home.howstuffworks.com/nest-learning-thermostat.htm; downloaded Feb. 13, 2014; 1 page.
Nest Welcome Guide; obtained at http://support-assets.nest.com/images/000001160/WelcomeGuide.pdf; downloaded Feb. 13, 2014; 10 pages.
The Internet of Everything; obtained at http://venturebeat.com/2013/09/23/freescale-launches-gateway-platform-for-the-internet-of-things/; Sep. 23, 2013; 5 pages.
i.MX6 Series of Application Processors; obtained at http://cache.freescale.com/files/32bit/doc/fact_sheet/IMX6SRSFS.pdf?fpsp=1&Parent_nodeId=1337697660448712057781&Parent_pageType=product; downloaded Feb. 13, 2014; 4 pages.

* cited by examiner

SMART HOME LEARNING SYSTEM INCLUDING USER BEHAVIOR

BACKGROUND

The present application relates to embedded devices and more specifically to systems and methods for facilitating automatic control of devices, such as smart appliances, that are embedded in larger computing environments.

Embedded devices are employed in various demanding applications, including sensor networks for monitoring vehicular traffic on roads, smart homes, vehicular mesh networks for controlling autonomous vehicles, and so on. Such applications demand efficient systems and mechanisms for collecting and using data from accompanying embedded devices.

Efficient and capable embedded devices and accompanying systems are particularly important in smart home and smart building applications, where inefficiencies may be costly, e.g., resulting in excess power consumption, user inconvenience, inefficient warehouse inventory management, and so on.

An example smart home implementation of embedded devices includes so-called smart appliances, such as computerized thermometers, that can be remotely controlled via an application running on a smartphone. The thermometers can also be set to adjust temperature settings at particular times.

However, such thermometers and other smart appliance are often disparate devices that provide limited user interaction and controllability and often lack mechanisms for fully leveraging applicable information and connectivity mechanisms.

SUMMARY

An example method for facilitating automatic smart device control based on past device behavior, current device events, sensor data, and/or server-sourced data includes receiving and storing data available from plural devices, resulting in stored data; determining a pattern in the stored data; using the pattern to generate one or more control signals; and forwarding the one or more control signals to one or more of the plural devices to selectively control one or more features of different devices of the one or more plural devices consistent with the pattern.

In a more specific embodiment, the method further includes controlling the one or more features of the different devices in a sequence consistent with the pattern and specified via the control signal. The specific example method may further include collecting a first set of data from one or more devices; obtaining a second set of data from a server coupled to a network; analyzing the first set of data and the second set of data to determine one or more control signals that anticipate future device usage or behavior; and employing the one or more control signals to adjust one or more behaviors of the one or more devices.

The analyzing step may include determining a pattern in the first set of data and/or in the second set of data and then using the pattern to make a prediction about a future state of the data; using the prediction to generate a first set of instructions to control the one or more devices; receiving a device signal from one or more of the one or more devices, wherein the device signal indicates that a probability of the prediction occurring at particular time exceeds a threshold; waiting until the particular time; and issuing the first set of instructions as the one or more control signals to the one or more devices at the particular time.

The device signal may include a signal from a sensor device, such as a thermometer, power consumption meter, barometric pressure sensor, motion detector, infrared camera, and so on. In a specific implementation, the device signal indicates a position of a person within a sensing region of the sensor.

Cloud-based data, e.g., "big data" that is accessible via a server system, further augments pattern recognition, device usage prediction, and so on, which facilitates development of control signals to control smart devices embedded in the accompanying computing environment. The cloud-based data may include data associated with one or more persons or buildings in a geographic region about the building, such as local news and weather information and data pertaining to one or more appliances within the geographic region, such as a neighborhood, zip code, and so on, which may encompass one or more nearby homes employing smart embedded device control systems and/or methods in accordance with various embodiments discussed herein.

The example method may further include selectively activating one or more home appliances in response to data collected via one or more servers in communication with a gateway, wherein the gateway is positioned in within or in proximity to a home. Collected data may be filtered, stored, and periodically searched for new patterns occurring in the data.

Device usage and/or device behavior and/or user behavior predictions used to generate one or more control signals may be derived by comparing collected data with a sample table of data to determine whether a correlation exists between the collected data and data in the sample table of data. The prediction may be generated based on a correlation between the collected data and data in the sample table of data.

Alternatively, or in addition, the prediction may be based on a frequency of occurrence of an instance of data in the collected data (and timing information associated with occurrences of one or more instances of data) to generate a probability estimate. The probability estimate is employed to determine the prediction. The method may also include determining one or more cross-dependencies occurring between devices and adjusting the one or more controls signals based on the one or more cross-dependencies.

Accordingly, certain embodiments discussed herein may facilitate employing data from plural devices and exogenous data derived from server systems to facilitate automatically controlling behavior of networked devices, such as smart home appliances. Such embodiments may enable various benefits, such as triggering lights to automatically turn on when a user enters a particular room at a particular time; activating a sprinkler system when server-side data indicates that a fire is nearby; triggering automatic delivery of certain factory supplies to a warehouse when inventory decreases beyond a particular threshold; automatically turning on a heater in advance of a home owner's return at a particular time when the home temperature is below a predetermined level; turning off a sound system and lights in various rooms after data indicates that a user is preparing to sleep; turning off lower priority devices that may conflict with higher priority devices, and so on.

By collecting data from multiple sources, including multiple devices and sensors, and selectively providing feedback control signals to the devices, the devices are effectively coupled, as their behavior may influence each other. Insight is derived by learning device behaviors and usage patterns, and the insight may be leveraged to automatically control devices and systems to enhance device usage efficiency and user convenience.

A further understanding of the nature and the advantages of particular embodiments disclosed herein may be realized by reference of the remaining portions of the specification and the attached drawings.

DETAILED DESCRIPTION OF EMBODIMENTS

For the purposes of the present discussion, an embedded device may be any device, e.g., home appliance, sensor, and so on, which is coupled to or otherwise adapted to communicate with a computer. Such devices are often called smart devices or smart appliances, and may include wired or wireless communication mechanisms, such as BLUETOOTH, Wireless Fidelity (WiFi), or Near Field Communication (NFC) transceivers, etc. A computer may be any processor in communication with a memory.

For clarity, certain well-known components, such as hard drives, processors, operating systems, power supplies, Internet Service Providers (ISPs), firewalls, and so on, have been omitted from the figures. However, those skilled in the art with access to the present teachings will know which components to implement and how to implement them to meet the needs of a given implementation.

Figure 1:
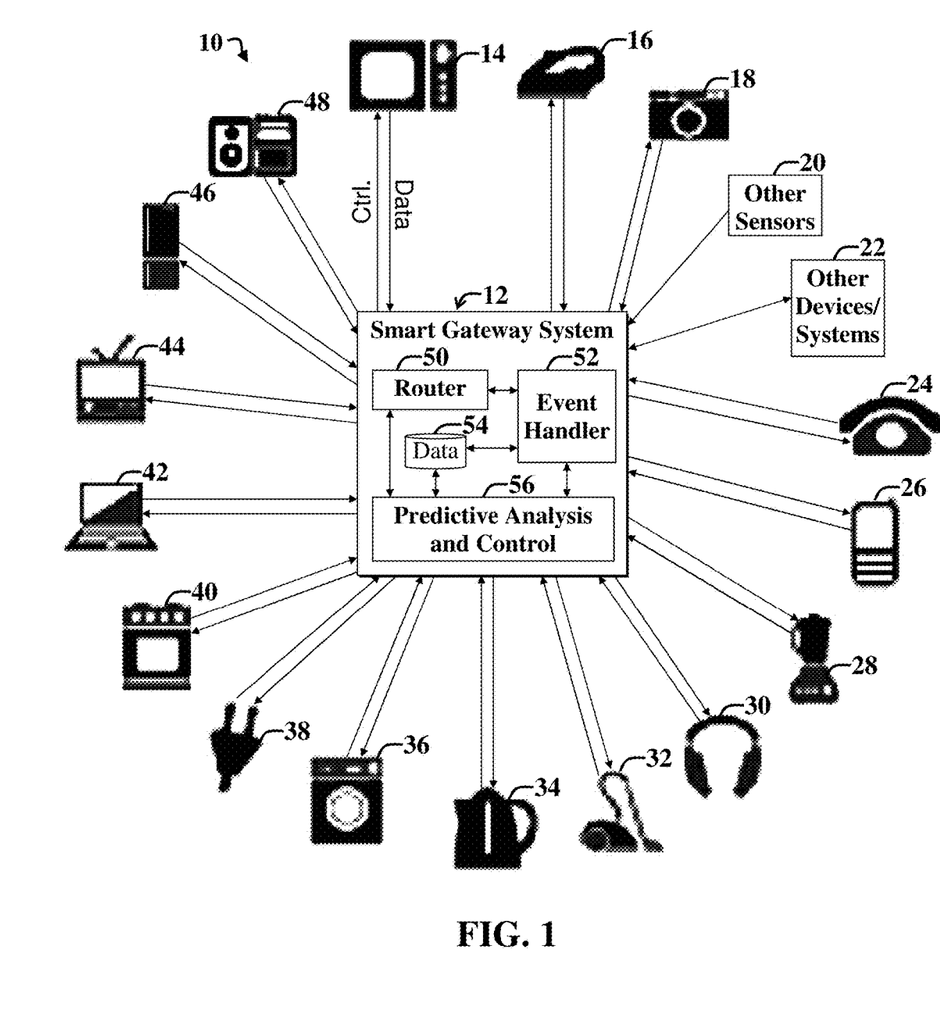
FIG. 1 is a diagram a first example system that leverages data from intercommunicating systems and devices to facilitate automatic control thereover based on learned data patterns and characteristics and predictions derived therefrom.

FIG. 1 is a diagram a first example system 10 that leverages data from intercommunicating systems 22 and devices 14-48 to facilitate automatic control thereover based on learned data patterns and characteristics. The system 10 includes a smart gateway system 12, which is adapted to receive input, e.g., event data, from plural devices and/or systems 14-48 in communication therewith and to selectively control (or otherwise provide input to) one or more of the devices 14-48. The system 10 is adapted to enable automatic or semiautomatic control over one or more of the accompanying devices and/or systems 14-48 based on device behavior predictions, learning rules, and/or other mechanisms or methods, as discussed more fully below.

For the purposes of the present discussion, a gateway may be any system that is adapted to facilitate routing information between connected devices. A smart gateway may be any gateway that includes a computer system and accompanying software for facilitating communications between devices or other systems. Smart gateways, as discussed herein, may further facilitate routing data and control signaling between devices to facilitate coordinating or controlling features and/or accompanying behaviors of devices or systems coupled to the smart gateway system.

The example smart gateway system 12 includes a router 50, which is connected to the plural devices and/or systems 14-48. Note that the various devices and/or systems 14-48 may include wired and/or wireless communications links with the router 50. Methods for receiving and routing wireless signals, such as BLUETOOTH, Wireless Fidelity (WiFi), and other types of wireless signals are known in the art.

For the purposes of the present discussion, a smart appliance may be any appliance that represents an embedded device, which may be any device that is coupled to or otherwise in communication with a computer. A home appliance may be any device or sensor that is adapted for use in or on proximity to a home. Similarly, a smart home appliance may be a home appliance that includes processing capabilities sufficient to relay information to and/or receive information from another device, such as a computer system or controller. A computer may be any processor coupled to a memory. Accordingly, certain smart home appliances may include computers and communication mechanisms, such that the smart home appliances act as embedded devices, which may be embedded in a larger computing environment that includes a remotely coupled computer, such as a controller.

Example devices and/or systems 14-48 include various smart appliances 14-18, 24-48, including a microwave oven 14, an iron 16, one or more cameras 18 (e.g., infrared location detectors and cameras, motion detectors, surveillance cameras, and so on), other sensors 20 (e.g., outdoor thermometers, barometric pressure sensors, garden moisture meters, and so on), other devices and/or systems 22 (e.g., electrically controllable lights, electrically controllable indoor and/or outdoor sprinkler system, a big data and analysis source, such as a cloud server system, and so on), a networked and computerized landline phone 24, a smartphone 26, a blender 28, a sound system 30, a vacuum 32, a coffee maker 34, a clothes washer and/or dryer 36, a smart electrical plug and/or outlet controller 38, an oven 40, a laptop computer 42, a television 44, a refrigerator 46, and a thermostat 48. As can be seen, outdoor thermometers, barometric pressure sensors, garden moisture meters, and an outdoor sprinkler system do not depend on occupancy of a room, home, or building.

Note that certain devices that represent conventional devices may be effectively converted to smart devices by plugging the devices into a smart wall outlet that may selectively control power to the devices plugged into the wall outlet.

Furthermore, note that the exact mix of smart devices or appliances is implementation-specific and may vary, without departing from the scope of the present teachings. For example, certain smart devices and/or systems 14-48 may be omitted or changed, and other smart devices may be used. Furthermore, some devices that only provide data, e.g., pure sensors, may be employed. For the purposes of the present discussion, a sensor may be any device adapted to measure or sense something or an occurrence or condition of something and to output a signal based on the sensing. A pure sensor may be any sensor that is dedicated to sensing and providing data reflective of sensed information. Note that certain smart devices, such as smartphones, may include plural sensors (e.g., compass, GPS receiver, accelerometer, touch screen sensors, etc.) and additional functionality other than sensing functionality, and hence, are not called pure sensors herein.

Examples of additional types of smart devices or appliances, which may be adapted for use with embodiments discussed herein, include automobile computer systems and accompanying embedded sensors and other devices (e.g., smart locks, air conditioners, etc.), computer controlled sprinkler systems, garage door openers, television remotes, electrically controllable solar panel steering motors, electric power consumption meters and/or controllers, and so on.

The example gateway system 12 further includes an event handler module 52 and a predictive analysis and control module 56 in communication with the router 50. Device event data, such as data indicating device status, behavior, and timing information, may be stored in a database 54 and accessible to the event handler 52 and predictive analysis and control module 56.

In operation, during an initial data gathering phase (also called learning phase), the event handler 52 detects device events and stores associated data in the database 54. Device event data may include device behavior status and timing information, which may indicate, for example that a certain device or feature of the device has been activated and/or deactivated at a certain time. Device event data may be matched with other contextual information at different times, where the contextual information may include device status information for other devices at the different times. The contextual information may further include, for example, news data, weather data, data and/or analysis results pertaining to smart home systems of users within the same geographical regions, e.g., similar neighborhoods and/or zip codes, and so on, from a cloud data center or other server-based data collection and/or analysis system.

After device event data and any other contextual data and associated timing information is collected sufficient to enable device behavior predictions beyond a predetermine probability threshold, algorithms of the predictive analysis and control system 56 begin to generate control signals to selectively automatically control one or more of the devices and/or systems 14-48.

Control signals generated by the predictive analysis and control module 56 are consistent with a set of rules, including learning rules, any device-conflict avoidance rules, rules that predict a user's preferences or predicted behavior (e.g., rules derived at least in part on past data from sensing conditions or actions of devices) and any user-set rules, as discussed more fully below. Note that the predictive analysis and control module 56 may include user interface functionality to enable a user to facilitate training of the smart gateway system 12 and setting or changing of system behaviors and/or other rules, such as default rules. Such user interface functionality may include an interactive visualization depicting currently learned patterns of the system 10 and future slated device-control commands.

The predictive analysis and control module 56 may run pattern matching software and/or other software, such as artificial intelligence software, which is adapted to analyze the stored data 54 and make predictions, e.g., based on probability or likelihood estimates that a user of the devices and/or systems 14-48 will wish to activate and/or deactivate certain device features at certain times, e.g., based on timing, user location information, and usage pattern information. Exact implementation details of the predictive analysis and control module 56 are implementation specific and may be readily developed by those skilled in the art to meet the needs of a given implementation without undue experimentation.

For the purposes of the present discussion, a prediction may be any estimate of a likelihood or probability of occurrence of an event with in a given future time window, where the likelihood or probability estimate exceeds a predetermined threshold. The threshold may be a default threshold or a dynamic threshold and may vary depending upon the needs of a given implementation. Those skilled in the art with access to the present teachings may readily determine implementation-specific details, such as appropriate thresholds and probability estimation methods, needed to meet the needs of a given implementation, without undue experimentation.

After the predictive analysis and control system 56 determines predicted user behavior, as for example, when a user turns on the computer 42, they immediately turn the volume off on the landline phone 24, activate a nearby light controlled by the plug 38, and adjust the thermostat 48 to a certain temperature, then the predictive analysis and control module 56 generates appropriate control signals to time automatic activation and/or deactivation and/or setting of the devices 42, 24, 38, 48 accordingly, where the device activation and/or deactivation sequence may be triggered, for example when the user turns on the computer 42. The control signals are then routed from the predictive analysis and control module 56 to the appropriate devices in a sequence (or, in some cases, simultaneously) determined by the data analysis and prediction estimates.

As another example, one or more sensors 20 that track user position within a household may enable the predictive analysis and control system 56 to determine, for example, that when a user enters a bedroom at a particular time and turns off a light, that all of the remaining devices should be set appropriately, e.g., phone volumes turned off, unused lights turned off, and so on.

Note that while various modules, such as the event handler 52, database 54, and predictive analysis and control module 56, are shown implemented via the smart gateway system 12, embodiments are not limited thereto. For example, the modules 52-56 may be implemented via a separate computer system, such as the laptop 42 and/or smartphone 26 or other mobile device (e.g., tablet computer), which may communicate with other embedded devices via the router 50 of a gateway system via which embedded devices are linked.

Figure 2:
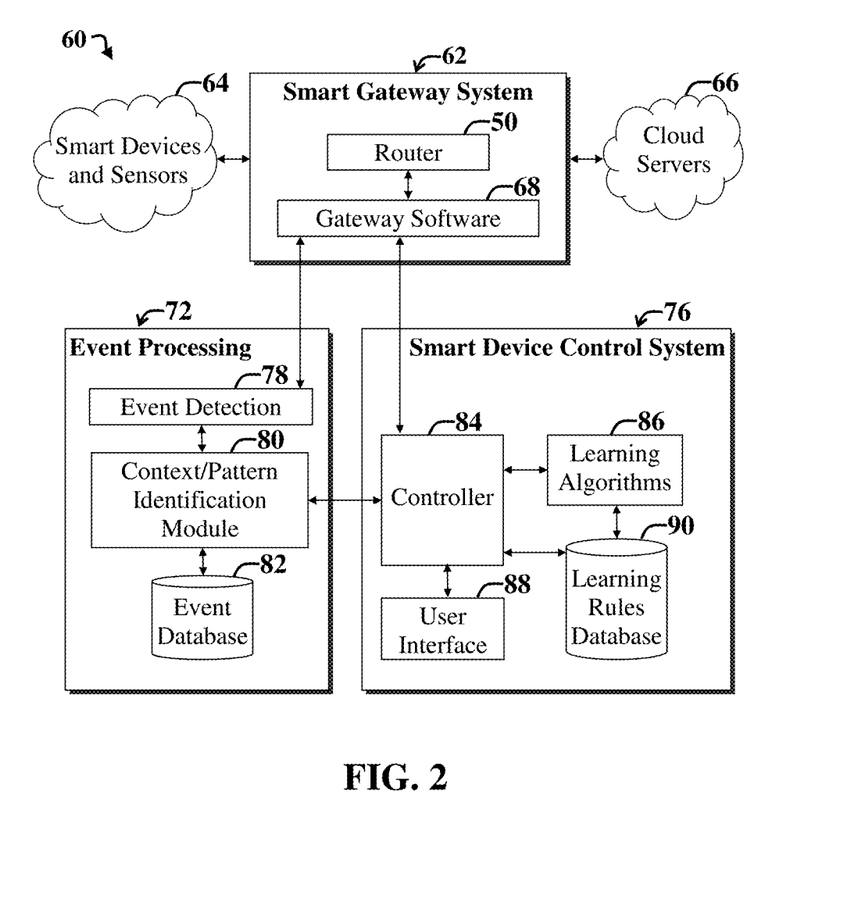
FIG. 2 is shows a second example embodiment of a system for automatically controlling smart devices based on learned and predicted device usage patterns and aggregated data and analysis from a cloud server system.

FIG. 2 is shows a second example embodiment of a system 60 for automatically controlling smart devices 64 based on learned and predicted device behavior (e.g., predicted device usage patterns) and aggregated data and/or analysis provided by a cloud server system 66. In the present example embodiment, a smart device control system 76 and event processing system 72 are implemented on one or more computers that are separate from a streamlined smart gateway system 62.

The example smart gateway system 62 includes the router 50 and accompanying gateway software 68. The gateway software 68 is adapted to facilitate interfacing the smart gateway system 62 with the event processing system 72 and associated smart device control system 76.

The example event processing system 72 includes an event detector 78 in communication with a context/pattern identification module 80, which communicates with an event database 82. The context/pattern identification module 80 communicates with a controller 84 of the smart device control system 76.

The smart device control system 76 further includes learning algorithms 86 in communication with the controller 84 and a learning rules database 90. A user interface 88, which may include hardware and/or Graphical User Interface (GUI) software for facilitating system adjustments, training, and/or customization, communicates with the controller 84 of the smart device control system 76.

In operation, aggregated cloud data and device usage information, including any sensor data, is routed from the devices and sensors 64 and cloud servers 66 through the smart gateway system 62 to the event processing system 72. As new data is generated and available, the event detection module 78 detects the new event and forwards the associated data to the context/pattern identification module 80. The context/pattern identification module 80 runs computer code that is adapted to determine if the new event information will result in any changes to default or predetermined data patterns and/or constitutes data sufficient to trigger generation of a control signal by the smart device control system 76.

For the purposes of the present discussion, a pattern in data, also called data pattern, may be any phenomena or characteristic that provides a basis for estimating a prediction or otherwise generating a controls signal based on rules applicable to data pattern exists.

If the new data is consistent with a predetermined pattern (e.g., as may be stored along with collected event data in the event database 82), and if the new data indicates, for example, that the likelihood that the user will wish to turn on a particular appliance next, then the context/pattern identification module 80 may send an alert signal to the controller 84 of the smart device control system 76.

In the present specific embodiment, the controller 84 runs computer code adapted to process the event signal, with reference to learning algorithm 86 calculations and stored learning rules 90, to determine an appropriate control signal. The control signal includes instructions to be forwarded to the particular appliance that is to be activated or otherwise affected next.

During an initial training phase, the event processing system 72 may filter incoming event, sensor, and cloud data and store the resulting filtered data in the event database 82. Computer code running on the context/pattern identification module 80 may then analyze data in the event database to facilitate constructing and identifying patterns.

The controller 84 may also access data in the event database 82 via the context/pattern identification module 80, which may act as a signal relay in certain implementations. Alternatively, the controller 84 may communicate directly with the event database 82 to further analyze data patterns included therein.

The context/pattern identification module 80 may include computer code for determining estimates of probability density functions (e.g., via recursive Bayesian estimation techniques) and may integrate the functions over certain intervals to determine probability estimates. If the probability that a subsequent device event should be triggered immediately (or at a predetermined future time) exceeds an implementation-specific threshold, then an alert signal may be generated.

The learning algorithms 86 of the smart device control system 76 are adapted to evaluate pattern information, event probability information, and so on, accessible from the event database 82 and context/pattern identification module 80 via the controller 84. The learning algorithms 86 further reference the learning rules database 90 to ensure that adjustments to system behaviors and control signal generation remain consistent with the learning rules maintained in the learning rules database 90.

The learning rules 90 might specify for example, that probabilities of occurrences for certain events should be adjusted based on frequency-of-occurrence and timing information. Alternatively, or in addition, the learning rules 90 might specify that newly learned behaviors should be based upon correlation of a particular pattern of device usage and/or behaviors with a set of predetermined or default template patterns.

Note that the learning algorithms 86 may employ simple probability-based learning methods and/or more advanced artificial intelligence learning methods. The exact choice of learning methods and details thereof are implementation specific and may vary depending upon the particular implementation. Those skilled in the art with access to the present teachings may readily determine and incorporate appropriate learning algorithms to meet the needs of a given implementation, without undue experimentation.

In certain implementations, the learning algorithms 86 may forward adjustments to the context/pattern identification module 80 to change the way patterns are detected or alert signals are generated.

The user interface 88 may include a GUI adapted to enable a user to specify particular usage patterns (e.g., via system training); to adjust learning rules; and so on. For example, a user may specify that if the outside temperature is below a certain temperature, and then turn up the thermostat to a certain temperature 30 minutes before the user typically returns from work. However, if sufficient data is already collected by the system 60 based on past usage of smart appliances (e.g., thermostat), then the event processing system 72 and smart device control system 76 may already have determined the activation sequence. Nevertheless, if the system 60 has determined that the best time to turn up or down the thermostat is ten minutes before the user has returned home, the user may still have the option to override the determination.

Figure 3:
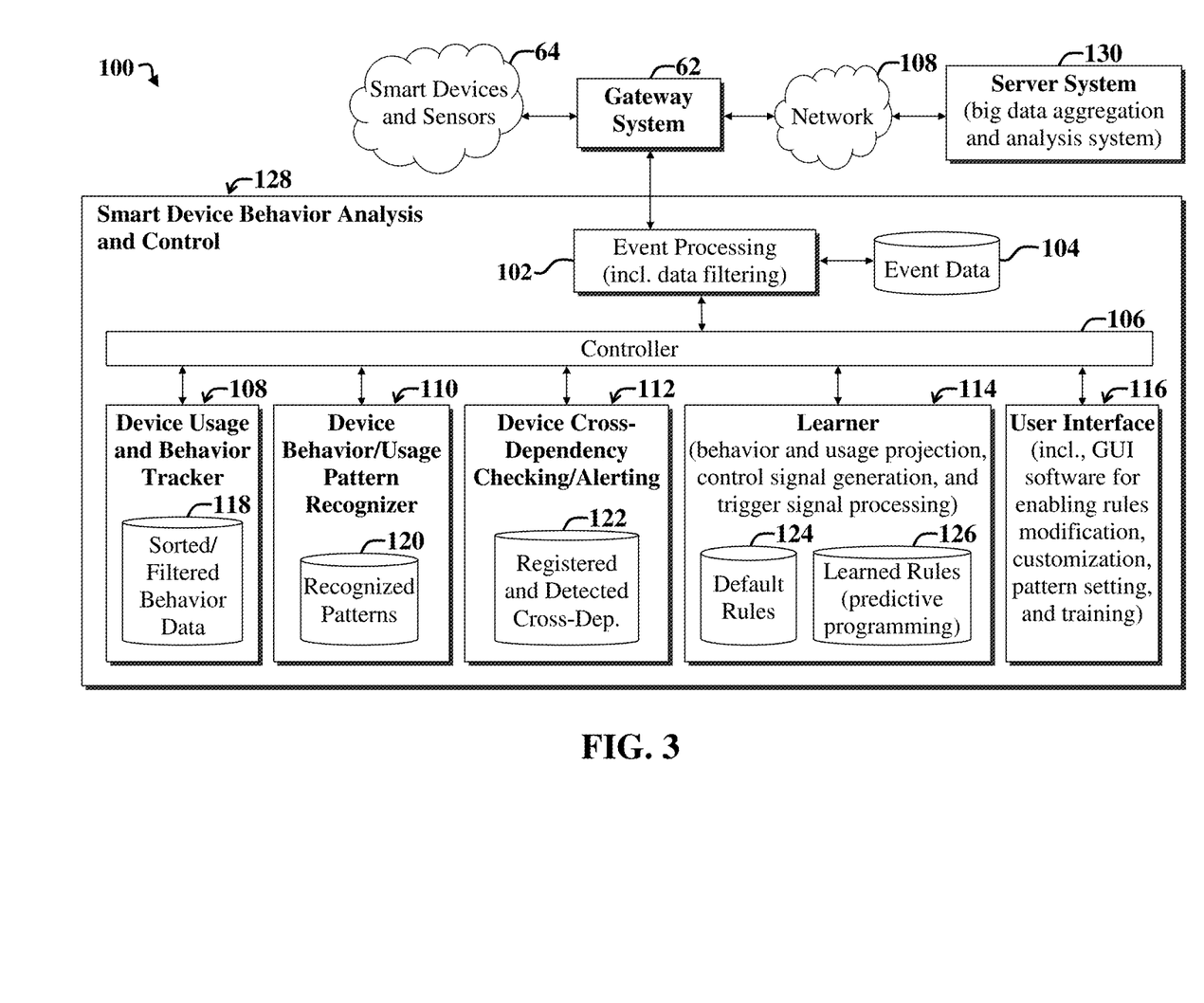
FIG. 3 shows a third more detailed example embodiment of a system for controlling smart devices based smart device data and cloud based data.

FIG. 3 shows a more detailed example embodiment of a third example system 100 for controlling smart devices 64 based on data from smart devices and appliances 64 and data retrieved from one or more servers 106. The server system 130 may be a cloud or other server system that includes one or more servers and accompanying software in communication with the gateway system 62, e.g., via a cloud service.

For the purposes of the present discussion, a cloud service may be any mechanism (e.g., one or more web services, Application Programming Interfaces (APIs), etc.) for enabling a user to employ data and/or functionality provided via a cloud. A cloud may be any collection of one or more servers. For example, certain clouds are implemented via one or more data centers with servers that may provide data, data storage, and other functionality accessible to client devices, such as the smart device behavior analysis and control system 128, via the Internet.

Similarly, cloud-based data may be any data maintained on one or more servers and accessible to one or more client devices via a network, such as the network 108, which may represent the Internet or other network. Examples of certain cloud-based data, e.g., "big data," include geocoded aggregated device data, news and weather report data, search engine data, and so on.

Note that cloud-based data may be virtually unlimited. In certain implementations, certain portions of cloud data may represent data and/or metadata that is collected from plural systems, like the system of FIG. 100 of FIG. 3.

In the present example embodiment, the smart device behavior analysis and control system or module 128 is adapted to communicate with and lodge locally-derived appliance and sensor data back to the server system 130 for aggregation and server-side analysis. For example, neighbors of a person using a home-based system similar to the system 100 may provide similar, parallel, or otherwise related data as the system 100 provides to the server system 130, resulting in aggregated data that may be mined by the system 100 for additional patterns and insight that may be fed back to client systems communicating with the server system 130.

In the present example embodiment, the smart device behavior analysis and control system 128 (also simply called the analysis and control system 128) communicates with the smart devices and sensors 64 and the server system 130 via the gateway system 62. The analysis and control system 128 includes a streamlined event processor 102 in communication with an event database 104.

The event processing system 102 is adapted to detect occurrences of device events (e.g., the turning on or off of a light, adjustment to a thermostat, and so on) and stores associated event data, including time of occurrence of the event, in the event database 104. The event processor 102 is also adapted to facilitate access to the event data 104 by other modules in the system 100, including a controller 106 of the analysis and control system 128 and by the server system 130. The event processor 102 is also adapted to facilitate routing control signals from the controller 106 through to one or more of the smart devices and sensors 64 via the gateway system 62. Note however, that in certain implementations, the controller 106 may send control signals directly through the gateway system 62, bypassing the event processing module 102.

The controller 106 includes computer code for facilitating interfacing communications between various modules 102, 104, 108-116 of the analysis and control system 128. Example modules include a device usage and behavior tracker 108 and accompanying filtered behavior database 118; a device behavior and usage pattern recognizer 110 and accompanying recognized pattern database 120; a device cross-dependency checking and alerting module 112 and accompanying cross-dependency database 122; a learner module 114 and accompanying default rules database 124 and learned rules database 126; and a user interface module 116.

The device usage and behavior tracker 108 is adapted to track device behavior and usage data, also called event data; filter the data in accordance with a predetermined filtering algorithm (e.g., Bayesian filtering algorithm), and store resulting filtered data. Note that in certain implementations, the device usage and behavior tracker 108 may be implemented as part of the event processor 102. Accordingly, various module groupings shown in the figures are merely illustrative and may vary, without departing from the scope of the present teachings.

The device behavior and usage pattern recognizer 110 is adapted to analyze the filtered data 118 to ascertain one or more patterns. The analysis may include correlating data from one or more tables of data representing event data from one or more devices with a candidate pattern to determine a correlation value for use in device usage/behavior predictions. Candidate patterns may be modified to match or correlate with certain frequently observed patterns, and/or the candidate patterns may be employed to find otherwise obscure patterns in the filtered data 118. Detected and/or recognized patterns may then be stored in the recognized patterns database 120 for use by the learner 114, as discussed more fully below.

The device cross-dependency checking and alerting module 112 maintains a record of known or recently detected cross-dependencies between behaviors of different smart devices and/or sensors 64. Registered cross-dependency information is stored in the cross-dependency database 122 for subsequent use in generating control signals by the learner 114.

For the purposes of the present discussion, a cross-dependency between any two or more devices may be any condition, as may be specified by one or more rules, wherein the condition generates a conflict, as indicated by the rules. For example, a cross-dependency may affect the desirability of operation of one device simultaneously with another device, whereby the desirability of such operation is reflected in cross-dependency rules and/or data maintained in the cross-dependency database 122. For example, the rules may specify not to operate a heater concurrently with an air conditioner in the same room. The heater and air conditioner are said to exhibit a cross-dependency, such that the operation of one device shall affect the operation of the other device. Another example of cross-dependency data includes information indicating that a vacuum cleaner should not be run in a room while the television is on.

The learner 114 runs one or more learning algorithms that are adapted to reference the default rules 124 and learned rules 126 while generating device control signals based on the filtered behavior data 118, recognized patterns 120, registered device cross-dependencies 122, and any big data and/or associated analysis results obtained from the server system 130. The learner 114 may run predictive algorithms on matched patterns, determine behavior and usage predictions, implement control signal generation, and so on.

Note that in certain implementations, the learner 114 may also periodically check, e.g., search, the event database 104 to ensure that any data relevant to a particular learning algorithm has not been filtered out by the device usage and behavior tracker 108. If data has been filtered out, the learner 114 may forward an adjustment to the tracker 108 to enable passing of subsequent related data to the filtered database 118.

Note that while in the present example embodiment, data from the smart devices and sensors 64 is first forwarded to the analysis and control system 128 before it (and any pattern information) is made available to the server system 130 through the analysis and control system 128, embodiments are not limited thereto. For example, device event data associated with the smart devices and sensors 64 may, in some implementations, be forwarded to the server system 130 and then forwarded back to the analysis and control system 128 via the gateway 62.

Alternatively, local data derived from the smart devices and sensors 64 is selectively routed to the server system 130 via the analysis and control system 128. The analysis and control system 128 may intercept and process local data before it is forwarded to the server system 130. Subsequently, the server system 130 may aggregate and analyze the data and periodically return (or upon request) cloud processing results back to the analysis and control system 128.

Hence, the system 100 may implement various methods, such as determining a pattern (e.g., via the device behavior and usage pattern recognizer 110) in the first set of data and/or in the second set of data and using the pattern to make a prediction (e.g., via the learner module 114) about a future state of the data; using the prediction to generate a first set of instructions (e.g., via the learner module 114) to control the one or more devices; receiving a device signal (e.g., corresponding to a currently generated device event) from one or more of the one or more devices, wherein the device signal indicates that a probability of the prediction occurring at particular time exceeds a threshold (e.g., as determined via the learner 114 with reference to databases 118-126); and waiting until the particular time (e.g., corresponding to a time associated with a predicted device event), and issuing the first set of instructions as the one or more control signal to the one or more devices at the particular time.

Figure 4:
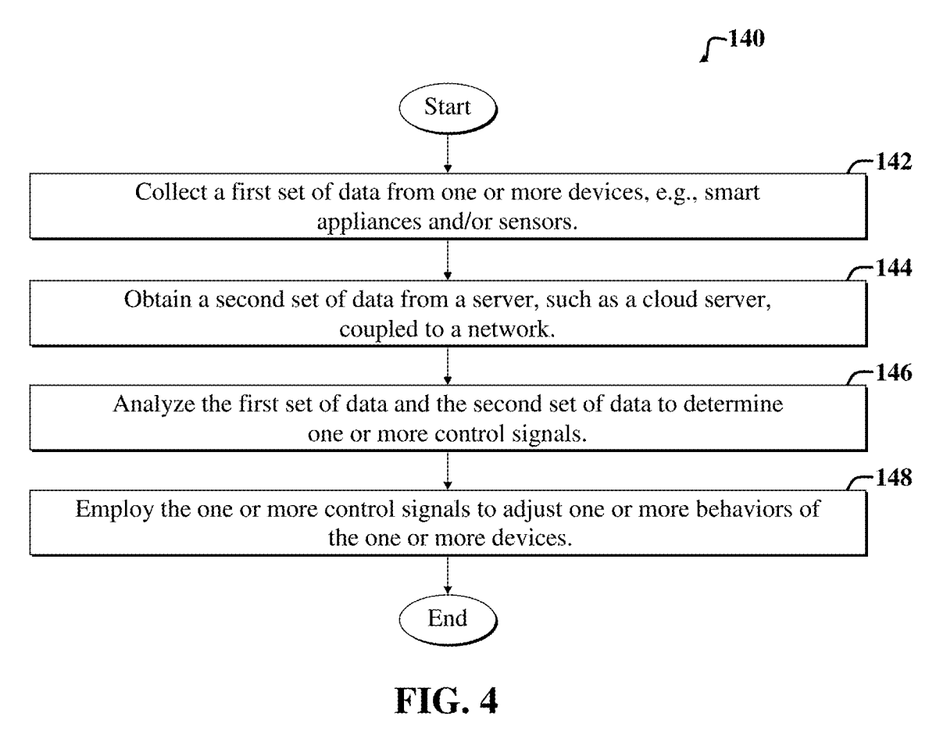
FIG. 4 is a flow diagram of a first example method adapted for use with the embodiments of FIGS. 1-3.

FIG. 4 is a flow diagram of a first example method adapted 140 adapted for use with the embodiments of FIGS. 1-3. The example method 140 is adapted to facilitate automatic control of one or more devices. The example method 140 includes a first step 142, which involves collecting a first set of data from one or more devices.

A second step 144 includes obtaining a second set of data from a server coupled to a network.

A third step 146 includes analyzing the first set of data and the second set of data to determine one or more control signals.

A fourth step 148 includes employing the one or more control signals to adjust one or more behaviors of the one or more devices.

Note that various steps 142-148 may be modified, rearranged, or omitted, and other steps may be added, without departing from the scope of the present teachings. For example, the third step 146 may include determining a pattern in the first set of data and/or in the second set of data and using the pattern to make a prediction about a future state of the data; using the prediction to generate a first set of instructions to control the one or more devices; receiving a device signal from one or more of the one or more devices, wherein the device signal indicates that a probability of the prediction occurring at particular time exceeds a threshold; and waiting until the particular time, and issuing the first set of instructions as the one or more control signal to the one or more devices at the particular time.

Figure 5:
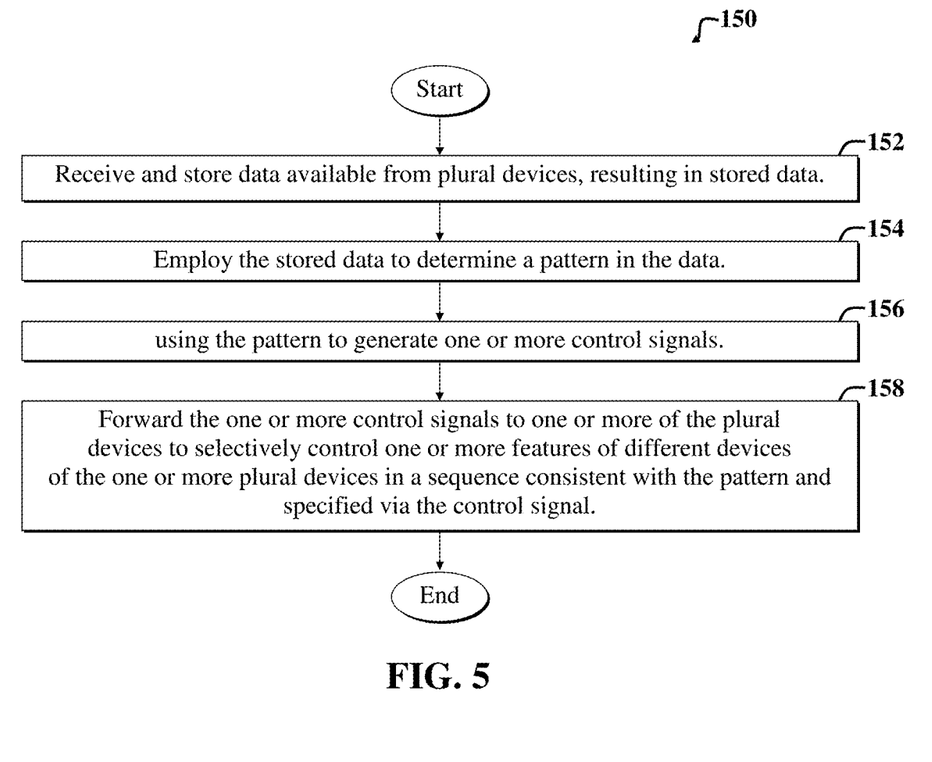
FIG. 5 is a flow diagram of a second example method adapted for use with the embodiments of FIGS. 1-3.

FIG. 5 is a flow diagram of a second example method 150 adapted for use with the embodiments of FIGS. 1-3. The second example method 150 includes an initial data-receiving step 152, which includes receiving and storing data available from plural devices, resulting in stored data.

A subsequent data-employing step 154 includes employing the stored data to determine a pattern in the data.

A subsequent pattern-using step 156 includes using the pattern to generate one or more control signals.

Finally, a forwarding step 158 includes forwarding the one or more control signals to one or more of the plural devices to selectively control one or more features of different devices of the one or more plural devices consistent with the pattern.

Note that the method 150 may be modified or augmented, without departing from the scope of the present teachings. For example, the method 150 may further include selectively controlling the one or more features of the different devices in a sequence consistent with the pattern and specified via the control signal.

The device signal may include a signal from a sensor device, such as a signal indicating a position of a person within a sensing region of the sensor (e.g., an infrared sensor or thermometer), and so on.

The method 150 may further include accessing cloud-based data from a server via a cloud service, wherein the cloud-based data includes data associated with one or more persons or buildings in a geographic region about the building. For example, the data associated with one or more persons or buildings may include data pertaining to one or more appliances within the geographic region and/or may include weather and/or news information pertaining to the geographic region.

The method 150 may further include analyzing one or more patterns in collected data; generating a prediction of a future condition or event based on the analysis of the one or more patterns; and using the prediction to generate instructions for controlling a device in preparation for using the instructions in one or more control signals to be forwarded to the one or more different devices.

Additional example steps include selectively activating one or more in-building appliances (e.g., home appliances, factory appliances, warehouse appliances, etc.) in response to data collected via one or more servers in communication with a gateway, wherein the gateway is positioned in within or in proximity to the building; including filtering stored data retrieved from plural devices and providing filtered data to a learning module. For example, certain components (i.e., in-building appliances) of a home security system could be automatically be activated or adjusted if a recent (e.g., real-time) crime report indicates a theft in the neighborhood, where the report is retrieved from a server (e.g. cloud) via a gateway. As can be seen, retrieving a crime report from a server indicating a theft in the neighbor does not depend on occupancy of a room, home, or building.

The method 150 may further include generating a prediction of future device usage based, in part, on a comparison of collected data with a sample table of data to determine whether a correlation exists between the collected data and data in the sample table of data.

Furthermore a prediction may be generated based on a correlation between the collected data and data in the sample table of data. The example method 150 may further include determining a causal relationship between the collected data and a second set of data, and employing a determination of the causal relationship to generate the prediction. Alternatively, or in addition, a determination of a frequency of occurrence of an instance of data in collected data, along with timing information associated with the occurrences of one or more instances of data, may be employed to facilitate generating a probability estimate, which is then used to determine the prediction.

The example method 150 may further include determining one or more cross-dependencies occurring between devices and adjusting the one or more controls signals based on the one or more cross-dependencies.

Although the description has been described with respect to particular embodiments thereof, these particular embodiments are merely illustrative, and not restrictive. For example, while certain embodiments are discussed with respect to selective automatic control over smart home appliances, embodiments are not limited thereto. For example, similar systems may be implemented in automobiles for controlling devices coupled to an onboard computer; in hospitals for facilitating monitoring and controlling patient devices, lighting, temperature, alarms, and so on; in warehouses for monitoring inventory, controlling machinery, and so on.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for facilitating control of devices, the method comprising:
   receiving and filtering event data available from plural devices, resulting in a first set of filtered data, wherein a Bayesian filtering algorithm is used to filter the data;
   determining a first pattern in the first set of filtered data;
   using the first pattern to generate one or more first control signals, wherein the one or more first control signals are consistent with a set of device-conflict avoidance rules;
   forwarding the one or more first control signals to one or more of the plural devices associated with a building to selectively control one or more features thereof, wherein a control signal of the one or more first control signals is based on contextual information derived from outside of the building and device event data at different times;
   collecting and filtering a second set of event data from the one or more of the plural devices, resulting in a second set of filtered data, wherein the collected second set of event data represents user interaction with the plural devices;
   generating a prediction of a future set of state data, representing the likelihood that the user will interact with a first device, at least by comparing the second set of filtered data with a sample table of data, to determine a correlation between the second set of filtered data and data in the sample table of data;
   determining a frequency of occurrence of an instance of data in the second set of filtered data and timing information associated with occurrences of one or more instances of data to generate a probability estimate, wherein probability estimates are determined using recursive Bayesian estimation;
   employing the probability estimate to determine the prediction of the future set of state data; and
   sending one or more second control signals to one or more of the plural devices based on the prediction of the future set of state data, wherein the one or more second control signals are consistent with the learning rules and the one or more second control signals cause one or more different operational states on one or more of the plural devices than the one or more first control signals that are consistent with the set of device-conflict avoidance rules.

2. The method of claim 1, further including employing the one or more first control signals to selectively control one or more features of two or more of the plural devices in a sequence consistent with the first pattern and specified via the one or more first control signals.

3. The method of claim 1, further including:
   obtaining and filtering a third set of event data from a server coupled to a network;
   analyzing the second set of filtered data and the third set of filtered data to determine one or more additional control signals; and
   employing the one or more additional control signals to adjust one or more behaviors of the one or more of the plural devices.

4. The method of claim 3, wherein analyzing further includes:
   determining a second pattern in the second set of filtered data or in the third set of filtered data and using the second pattern to make a prediction about a future state of the second set of filtered data or the third set of filtered data;
   using the prediction about the future state to generate a first set of instructions to control the one or more of the plural devices;
   receiving a device signal from the one or more of the plural devices, wherein the device signal indicates that a probability of the prediction about the future state occurring at particular time exceeds a threshold;
   waiting until the particular time; and
   issuing the first set of instructions as the one or more additional control signals to the one or more of the plural devices at the particular time.

5. The method of claim 4, wherein the device signal includes a signal from a sensor device.

6. The method of claim 5, wherein the device signal indicates a position of a person within a sensing region of the sensor device.

7. The method of claim 3, further including accessing cloud-based data from a server, wherein the cloud-based data includes data associated with one or more persons or buildings in a geographic region.

8. The method of claim 7, wherein the data associated with one or more persons or buildings includes data pertaining to one or more appliances within the geographic region.

9. The method of claim 7, wherein the data associated with the one or more persons or buildings includes weather information pertaining to the geographic region.

10. The method of claim 3, wherein analyzing further includes:
   analyzing one or more patterns in the second set of filtered data;
   generating a prediction of a future condition or event based on the analyzing of the one or more patterns in the second set of filtered data; and
   using the prediction of a future condition or event to generate instructions for controlling the one or more of the plural devices in preparation for incorporation of the instructions in the one or more additional control signals, the one or more additional control signals to be forwarded to the one or more of the plural devices.

11. The method of claim 10, wherein the one or more of the plural devices include one or more home appliances, and further including selectively activating the one or more home appliances in response to data collected via one or more servers in communication with a gateway, wherein the gateway is positioned within a home.

12. The method of claim 10, wherein the second set of filtered data includes data relating to a user's usage of the plural devices and the method further comprising:
   generating the one or more first control signals in accordance with a prediction of the user's behavior.

13. The method of claim 12, further including periodically searching two or more servers maintaining the first set of filtered data for new patterns occurring in the first set of filtered data.

14. The method of claim 10, further including generating a prediction based on a correlation between the second set of filtered data and at least a subset of the data in the sample table of data.

15. The method of claim 1, wherein a user interface enables training of a smart gateway system, wherein the smart gateway system comprises:
   a router connected to the plural devices and that enables modules implemented via a separate computer system to communicate with devices of the smart gateway system;
   a gateway software that facilitates interfacing the smart gateway system with an event processing system and an associated smart device control system
   a database that device event data is stored in;
   an event handler that detects device events and stores associated data in the database; and
   a predictive analysis and control module in communication with the router that generates control signals to selectively automatically control one or more of the plural devices, wherein the control signals generated by the predictive analysis and control module are consistent with a set of rules and based on analysis of the data stored in the database.

16. An apparatus comprising:
   a processor coupled to a display and to a processor-readable storage device, wherein the processor-readable storage device includes one or more instructions executable by the processor to perform the following acts:
   receiving and filtering event data available from plural devices, resulting in a first set of filtered data, wherein a Bayesian filtering algorithm is used to filter the data;
   determining a first pattern in the first set of filtered data;
   using the first pattern to generate one or more first control signals, wherein the one or more first control signals are consistent with a set of device-conflict avoidance rules;
   forwarding the one or more first control signals to one or more of the plural devices associated with a building to selectively control one or more features thereof, wherein a control signal of the one or more first control signals is based on contextual information derived from outside of the building and device event data at different times;
   collecting and filtering a second set of event data from the one or more of the plural devices, resulting in a second set of filtered data, wherein the collected second set of event data represents user interaction with the plural devices;
   generating a prediction of a future set of state data, representing the likelihood that a user will interact with a first device, at least by comparing the second set of filtered data with a sample table of data, to determine a correlation between the second set of filtered data and data in the sample table of data;
   determining a frequency of occurrence of an instance of data in the second set of filtered data and timing information associated with occurrences of one or more instances of data to generate a probability estimate, wherein probability estimates are determined using recursive Bayesian estimation;
   employing the probability estimate to determine the prediction of the future set of state data; and
   sending one or more second control signals to one or more of the plural devices based on the prediction of the future set of state data, wherein the one or more second control signals are consistent with the learning rules and the one or more second control signals cause one or more different operational states on one or more of the plural devices than the one or more first control signals that are consistent with the set of device-conflict avoidance rules.

17. A non-transitory processor-readable storage device including instructions executable by a processor, the processor-readable storage device including one or more instructions for:
   receiving and filtering data available from plural devices, resulting in a first set of filtered data, wherein a Bayesian filtering algorithm is used to filter the data;
   determining a first pattern in the first set of filtered data;
   using the first pattern to generate one or more first control signals, wherein the one or more first control signals are consistent with a set of device-conflict avoidance rules;
   forwarding the one or more first control signals to one or more of the plural devices associated with a building to selectively control one or more features thereof, wherein a control signal of the one or more first control signals is based on contextual information derived from outside of the building and device event data at different times;
   collecting and filtering a second set of event data from the one or more of the plural devices, resulting in a second set of filtered data, wherein the collected second set of state data represents user interaction with the plural devices;
   generating a prediction of a future set of state data, representing the likelihood that the user will interact with a first device, at least by comparing the second set of filtered data with a sample table of data, to determine a correlation between the second set of filtered data and data in the sample table of data;

determining a frequency of occurrence of an instance of data in the second set of filtered data and timing information associated with occurrences of one or more instances of data to generate a probability estimate, wherein probability estimates are determined using recursive Bayesian estimation;

employing the probability estimate to determine the prediction of the future set of state data; and sending one or more second control signals to one or more of the plural devices based on the prediction of the future set of state data, wherein the one or more second control signals are consistent with the learning rules and the one or more second control signals cause one or more different operational states on one or more of the plural devices than the one or more first control signals that are consistent with the set of device-conflict avoidance rules.

\* \* \* \* \*